(12) United States Patent
Son

(10) Patent No.: US 12,032,140 B2
(45) Date of Patent: Jul. 9, 2024

(54) LENS MODULE

(71) Applicant: Samsung Electro-Mechanics Co., Ltd., Suwon-si (KR)

(72) Inventor: Ju Hwa Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1 day.

(21) Appl. No.: 17/967,121

(22) Filed: Oct. 17, 2022

(65) Prior Publication Data

US 2023/0050423 A1  Feb. 16, 2023

Related U.S. Application Data

(63) Continuation of application No. 16/860,473, filed on Apr. 28, 2020, now Pat. No. 11,506,870, which is a continuation of application No. 15/890,529, filed on Feb. 7, 2018, now Pat. No. 10,678,024, which is a continuation of application No. 14/943,256, filed on Nov. 17, 2015, now Pat. No. 9,927,596.

(30) Foreign Application Priority Data

Dec. 10, 2014 (KR) .......................... 10-2014-0177445

(51) Int. Cl.
*G02B 13/00* (2006.01)
(52) U.S. Cl.
CPC ................................ *G02B 13/0045* (2013.01)
(58) Field of Classification Search
CPC ...... G02B 13/0045; G02B 13/18; G02B 9/00; G02B 9/64
See application file for complete search history.

(56) References Cited

U.S. PATENT DOCUMENTS

| | | | |
|---|---|---|---|
| 5,825,557 A | 10/1998 | Ohno | |
| 8,599,495 B1 | 12/2013 | Tsai et al. | |
| 9,116,329 B2 | 8/2015 | Fukaya | |
| 9,348,113 B2 | 5/2016 | Tang et al. | |
| 9,638,896 B2 | 5/2017 | Fukaya | |
| 9,927,596 B2 | 3/2018 | Son | |
| 2008/0106801 A1 | 5/2008 | Kang et al. | |
| 2013/0162886 A1 | 6/2013 | Morooka et al. | |

(Continued)

FOREIGN PATENT DOCUMENTS

| | | |
|---|---|---|
| CN | 103529539 A | 1/2014 |
| CN | 203606556 U | 5/2014 |

(Continued)

OTHER PUBLICATIONS

Taiwanese Office Action dated Jul. 26, 2016 in corresponding Taiwanese Application No. 104136089 (8 pages in Chinese and 4 pages in English).

(Continued)

*Primary Examiner* — Collin X Beatty
(74) *Attorney, Agent, or Firm* — NSIP Law

(57) ABSTRACT

A lens module includes first to seventh lenses each having refractive power and sequentially disposed in numerical order from the first lens to the seventh lens starting from an object side of the lens module, wherein each of the first and second lenses has a meniscus shape and an image-side surface that is convex, and the seventh lens has one or more inflection points on an image-side surface thereof.

15 Claims, 15 Drawing Sheets

(56) References Cited

U.S. PATENT DOCUMENTS

| | | | |
|---|---|---|---|
| 2014/0009843 A1 | 1/2014 | Tsai et al. | |
| 2014/0139719 A1 | 5/2014 | Fukaya | |
| 2014/0139931 A1 | 5/2014 | Kubota | |
| 2014/0253782 A1 | 9/2014 | Tsai et al. | |
| 2015/0070783 A1 | 3/2015 | Hashimoto | |
| 2015/0198791 A1 | 7/2015 | Kubota et al. | |
| 2015/0378131 A1 | 12/2015 | Tang et al. | |
| 2016/0124191 A1* | 5/2016 | Hashimoto | G02B 13/0045 359/708 |
| 2016/0131874 A1 | 5/2016 | Tang et al. | |

FOREIGN PATENT DOCUMENTS

| | | |
|---|---|---|
| CN | 203965708 U | 11/2014 |
| CN | 204065539 U | 12/2014 |
| JP | 9-127415 A | 5/1997 |
| JP | 2013-125213 A | 6/2013 |
| JP | 2014-102358 A | 6/2014 |
| JP | 2014-102408 A | 6/2014 |
| KR | 10-0292435 B1 | 6/2001 |
| TW | 200821621 A | 5/2008 |
| TW | 201403166 A | 1/2014 |

OTHER PUBLICATIONS

Korean Office Action dated Sep. 22, 2016 in corresponding Korean Application No. 10-2014-0177445 (6 pages in Korean and 3 pages in English).

Chinese Office Action dated Aug. 24, 2017 in corresponding Chinese Patent Application No. 201510836868.X. (7 pages in English and 5 pages in Chinese).

Chinese Office Action dated Nov. 4, 2020 in corresponding Chinese Patent Application No. 201910030673.4 (6 pages in English and 8 pages in Chinese).

* cited by examiner

| SURFACE NO. | RADIUS OF CURVATURE | THICKNESS/ DISTANCE | REFRACTIVE INDEX | ABBE NUMBER | REMARK | EFFECTIVE RADIUS |
|---|---|---|---|---|---|---|
| S1 | -4.850 | 0.327 | 1.744 | 44.800 | FIRST LENS | 1.400 |
| S2 | -3.993 | 0.070 | | | | 1.344 |
| S3 | -3.721 | 0.390 | 1.755 | 27.500 | SECOND LENS | 1.278 |
| S4 | -6.513 | 0.060 | | | | 1.184 |
| S5 | 1.828 | 0.663 | 1.547 | 56.114 | THIRD LENS (STOP) | 1.019 |
| S6 | -5.533 | 0.066 | | | | 0.900 |
| S7 | 8.572 | 0.250 | 1.644 | 23.370 | FOURTH LENS | 0.927 |
| S8 | 5.035 | 0.708 | | | | 0.939 |
| S9 | -1.452 | 0.319 | 1.644 | 23.370 | FIFTH LENS | 0.966 |
| S10 | -2.868 | 0.060 | | | | 1.229 |
| S11 | -7.424 | 0.825 | 1.547 | 56.114 | SIXTH LENS | 1.406 |
| S12 | -1.259 | 0.210 | | | | 1.565 |
| S13 | 3.904 | 0.508 | 1.547 | 56.114 | SEVENTH LENS | 1.821 |
| S14 | 1.059 | 0.345 | | | | 2.440 |
| S15 | infinity | 0.300 | 1.516 | 64.100 | FILTER | 2.754 |
| S16 | infinity | | | | | 2.863 |
| IMAGE PLANE | | | | | | 3.229 |

FIG. 4

| FIRST EXAMPLE | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| K | -1.3391 | 2.3172 | 2.0449 | 8.6896 | -0.3904 | -35.8728 | -20.0000 | -19.9917 | 0.6564 | 0.8861 | -56.6288 | -0.8569 | -78.2233 | -5.2952 |
| A | -0.0090 | 0.0157 | 0.0239 | 0.0134 | 0.0092 | -0.0117 | 0.0184 | 0.0055 | -0.0545 | -0.0289 | 0.0365 | 0.1156 | -0.1411 | -0.0949 |
| B | 0.0155 | -0.0219 | -0.0642 | -0.0221 | 0.0044 | -0.0765 | -0.1661 | -0.0749 | 0.0618 | 0.0847 | -0.0181 | -0.0712 | 0.0488 | 0.0464 |
| C | -0.0121 | 0.0012 | 0.0397 | 0.0327 | 0.0178 | 0.1724 | 0.3787 | 0.1167 | 0.0572 | -0.1518 | -0.0782 | 0.0764 | -0.0214 | -0.0196 |
| D | 0.0061 | 0.0117 | -0.0026 | -0.0250 | -0.0536 | -0.2099 | -0.5194 | -0.1591 | -0.2044 | 0.2043 | 0.1213 | -0.1243 | 0.0061 | 0.0058 |
| E | -0.0023 | -0.0066 | -0.0033 | 0.0137 | 0.0461 | 0.1247 | 0.4037 | 0.1811 | 0.3470 | -0.1128 | -0.0750 | 0.1435 | 0.0002 | -0.0011 |
| F | 0.0004 | 0.0012 | 0.0006 | -0.0034 | -0.0194 | -0.0310 | -0.1011 | -0.0896 | -0.2009 | 0.0216 | 0.0238 | -0.1041 | -0.0004 | 0.0001 |
| G | | | | | | | -0.0202 | | | | -0.0033 | 0.0467 | 5.E-05 | -7.E-06 |
| H | | | | | | | | | | | | -0.0115 | | -2.E-08 |
| J | | | | | | | | | | | | 0.0012 | | 1.E-08 |

FIG. 5

| SURFACE NO. | RADIUS OF CURVATURE | THICKNESS/ DISTANCE | REFRACTIVE INDEX | ABBE NUMBER | REMARK | EFFECTIVE RADIUS |
|---|---|---|---|---|---|---|
| S1 | -4.710 | 0.296 | 1.744 | 44.800 | FIRST LENS | 1.400 |
| S2 | -3.939 | 0.068 | | | | 1.351 |
| S3 | -3.662 | 0.405 | 1.752 | 27.700 | SECOND LENS | 1.287 |
| S4 | -6.140 | 0.040 | | | | 1.191 |
| S5 | 1.839 | 0.682 | 1.547 | 56.114 | THIRD LENS (STOP) | 1.023 |
| S6 | -5.298 | 0.031 | | | | 0.900 |
| S7 | 9.886 | 0.250 | 1.644 | 23.370 | FOURTH LENS | 0.921 |
| S8 | 5.366 | 0.724 | | | | 0.932 |
| S9 | -1.469 | 0.288 | 1.644 | 23.370 | FIFTH LENS | 0.973 |
| S10 | -2.920 | 0.030 | | | | 1.219 |
| S11 | -7.714 | 0.943 | 1.547 | 56.114 | SIXTH LENS | 1.366 |
| S12 | -1.281 | 0.251 | | | | 1.612 |
| S13 | 3.866 | 0.499 | 1.547 | 56.114 | SEVENTH LENS | 1.980 |
| S14 | 1.046 | 0.323 | | | | 2.598 |
| S15 | infinity | 0.300 | 1.516 | 64.100 | FILTER | 2.829 |
| S16 | infinity | | | | | 2.919 |
| IMAGE PLANE | | | | | | 3.203 |

FIG. 9

| SECOND EXAMPLE | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| K | -4.7101 | 2.3418 | 2.0388 | 1.0000 | -0.3467 | -35.8728 | -1.8046 | -10.0000 | 0.6464 | 0.8698 | -50.0000 | -0.8540 | -72.6755 | -5.1670 |
| A | -1.3961 | 0.0168 | 0.0301 | 0.0191 | 0.0113 | -0.0002 | 0.0351 | 0.0017 | -0.0572 | -0.0299 | 0.0382 | 0.1124 | -0.1327 | -0.0819 |
| B | -0.0102 | -0.0265 | -0.0803 | -0.0409 | 0.0085 | -0.1103 | -0.1521 | -0.0194 | 0.0625 | 0.0897 | -0.0174 | -0.0684 | 0.0463 | 0.0317 |
| C | 0.0181 | 0.0078 | 0.0556 | 0.0501 | -0.0235 | 0.1441 | 0.1216 | -0.1331 | 0.0902 | -0.1651 | -0.1091 | 0.0700 | -0.0206 | -0.0070 |
| D | -0.0132 | 0.0068 | -0.0889 | -0.0292 | 0.0347 | -0.0377 | 0.0798 | 0.3661 | -0.2392 | 0.2222 | 0.1813 | -0.1083 | 0.0057 | -0.0011 |
| E | 0.0054 | -0.0048 | -0.0026 | 0.0114 | -0.0299 | -0.0798 | -0.1471 | -0.3814 | 0.2975 | -0.1233 | -0.1218 | 0.1225 | 0.0004 | 0.0013 |
| F | -0.0017 | 0.0009 | 0.0007 | -0.0024 | 0.0048 | 0.0504 | 0.0113 | 0.1574 | -0.1384 | 0.0239 | 0.0414 | -0.0875 | -0.0004 | -0.0004 |
| G | 0.0003 | | | | | | 0.0517 | | | | -0.0061 | 0.0387 | 5.E-05 | 7.E-05 |
| H | | | | | | | | | | | | -0.0094 | | -6.E-06 |
| J | | | | | | | | | | | | 0.0009 | | 2.E-07 |

FIG. 10

| SURFACE NO. | RADIUS OF CURVATURE | THICKNESS/ DISTANCE | REFRACTIVE INDEX | ABBE NUMBER | REMARK | EFFECTIVE RADIUS |
|---|---|---|---|---|---|---|
| S1 | -4.507 | 0.305 | 1.743 | 44.800 | FIRST LENS | 1.400 |
| S2 | -3.288 | 0.057 | | | | 1.259 |
| S3 | -3.109 | 0.300 | 1.755 | 27.500 | SECOND LENS | 1.192 |
| S4 | -4.867 | 0.030 | | | | 1.126 |
| S5 | 1.967 | 0.500 | 1.547 | 56.114 | THIRD LENS (STOP) | 0.946 |
| S6 | -4.259 | 0.030 | | | | 0.930 |
| S7 | 16.277 | 0.250 | 1.644 | 23.370 | FOURTH LENS | 0.948 |
| S8 | 4.969 | 0.783 | | | | 0.952 |
| S9 | -1.666 | 0.270 | 1.644 | 23.370 | FIFTH LENS | 1.009 |
| S10 | -2.887 | 0.065 | | | | 1.190 |
| S11 | -15.090 | 0.769 | 1.547 | 56.114 | SIXTH LENS | 1.349 |
| S12 | -1.583 | 0.350 | | | | 1.658 |
| S13 | 3.556 | 0.361 | 1.547 | 56.114 | SEVENTH LENS | 1.856 |
| S14 | 1.010 | 0.259 | | | | 2.436 |
| S15 | infinity | 0.300 | 1.516 | 64.100 | FILTER | 2.782 |
| S16 | infinity | | | | | 2.882 |
| IMAGE PLANE | | | | | | 3.241 |

FIG. 14

| THIRD EXAMPLE | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| k | 1.5112 | 1.5722 | 2.0600 | 1.3209 | -0.2443 | -35.8729 | -1.8046 | -10.0000 | 0.5206 | 1.1441 | -50.0000 | -0.8120 | -71.6755 | -5.1298 |
| A | -0.0419 | 0.0087 | 0.0892 | 0.0664 | 0.0507 | -0.0088 | 0.0576 | 0.0091 | -0.0491 | -0.0511 | 0.0264 | 0.1327 | -0.2176 | -0.1477 |
| B | 0.0525 | -0.0201 | -0.1579 | -0.1780 | -0.0946 | -0.1507 | -0.3466 | -0.1030 | 0.1356 | 0.1113 | -0.0404 | -0.0561 | 0.1093 | 0.1021 |
| C | -0.0194 | 0.0224 | 0.0664 | 0.1757 | 0.1997 | 0.3936 | 0.7328 | 0.1235 | -0.2288 | -0.2533 | -0.1026 | -0.0373 | -0.0525 | -0.0596 |
| D | 0.0080 | -0.0091 | 0.0476 | -0.0921 | -0.3198 | -0.6026 | -1.0684 | -0.0048 | 0.4075 | 0.4458 | 0.2196 | 0.0956 | 0.0170 | 0.0260 |
| E | 0.0005 | 0.0008 | -0.0405 | 0.0371 | 0.2790 | 0.4759 | 1.1103 | -0.0672 | -0.2908 | -0.2994 | -0.1609 | -0.1060 | -0.0817 | -0.0082 |
| F | 0.0003 | 0.0005 | 0.0078 | -0.0085 | -0.1195 | -0.1617 | -0.6820 | 0.0387 | 0.0503 | 0.0691 | 0.0557 | 0.0754 | -0.0803 | 0.0018 |
| G | | | | | | | 0.1949 | | | | -0.0081 | -0.0311 | 4.E-05 | -3.E-04 |
| H | | | | | | | | | | | | 0.0066 | | 2.E-05 |
| J | | | | | | | | | | | | -0.0006 | | -8.E-07 |

FIG. 15

LENS MODULE

CROSS-REFERENCE TO RELATED APPLICATION(S)

This application is a Continuation of U.S. patent application Ser. No. 16/860,473 filed on Apr. 28, 2020, now U.S. Pat. No. 11,506,870 issued on Nov. 22, 2022, which is a Continuation of U.S. patent application Ser. No. 15/890,529 filed on Feb. 7, 2018, now U.S. Pat. No. 10,678,024 issued on Jun. 9, 2020, which is a Continuation of U.S. patent application Ser. No. 14/943,256 filed on Nov. 17, 2015, now U.S. Pat. No. 9,927,596 issued on Mar. 27, 2018, which claims the benefit under 35 USC § 119(a) of Korean Patent Application No. 10-2014-0177445 filed on Dec. 10, 2014, in the Korean Intellectual Property Office, the entire disclosures of which are incorporated herein by reference for all purposes.

BACKGROUND

1. Field

This application relates to a lens module having an optical system including seven lenses.

2. Description of Related Art

A lens module mounted in a camera of a mobile communications terminal typically includes a plurality of lenses. For example, the lens module may include seven lenses to configure n optical system having a high resolution.

However, when the optical system having a high resolution is configured using the plurality of lenses as described above, a length (distance from an object-side surface of a first lens to an image plane) of the optical system may be increased. In this case, it is difficult to install the lens module in a slim mobile communications terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens module includes first to seventh lenses each having refractive power and sequentially disposed in numerical order from the first lens to the seventh lens starting from an object side of the lens module; wherein each of the first and second lenses has a meniscus shape and an image-side surface that is convex; and the seventh lens has one or more inflection points on an image-side surface thereof.

An object-side surface of the first lens may be concave.
An object-side surface of the second lens may be concave.
Both surfaces of the third lens may be convex.
The fourth lens may have a meniscus shape and an object-side surface that is convex.
The fifth lens has a meniscus shape and an image-side surface that is convex.
The sixth lens may have a meniscus shape and an image-side surface that is convex.
The seventh lens may have a meniscus shape and an object-side surface that is convex.

The image-side surface of the seventh lens may be concave.

At least five of the first to seventh lenses may be made of plastic.

In another general aspect, a lens module includes a first lens having positive refractive power, an object-side surface thereof being concave; a second lens having negative refractive power; a third lens having positive refractive power; a fourth lens having negative refractive power; a fifth lens having refractive power; a sixth lens having refractive power; and a seventh lens having negative refractive power and having one or more inflection points on an image-side surface thereof; wherein the first to seventh lenses are sequentially disposed in numerical order from the first lens to the seventh lens starting from an object side of the lens module.

The fifth lens may have negative refractive power.
The sixth lens may have positive refractive power.
The lens module may further include a stop disposed between the third and fourth lenses.

In the lens module, 80°<FOV may be satisfied, where FOV is a field of view of an optical system including the first to seventh lenses.

In the lens module, d2/d3<0.2 may be satisfied, where d2 is a distance from an image-side surface of the first lens to an object-side surface of the second lens, and d3 is a thickness of the second lens.

In another aspect, a lens module includes first to seventh lenses each having refractive power and sequentially disposed in numerical order from the first lens to the seventh lens starting from an object side of the lens module; wherein effective radii of surfaces of the first to third lenses strictly decrease in order from an object-side surface of the first lens to an image-side surface of the third lens; and effective radii of surfaces of the fourth to seventh lenses strictly increase in order from an object-side surface of the fourth lens to an image-side surface of the seventh lens.

The first, third, and sixth lens may have positive refractive power; and the second, fourth, fifth, and seventh lenses may have negative refractive power.

The first, second, fourth, fifth, and sixth lenses may have a meniscus shape; the third lens may not have a meniscus shape; and the seventh lens may have one or more inflection points on an image-side surface thereof.

An image-side surface of each of the first, second, fifth, sixth, and seventh lenses may be concave; both surfaces of the third lens may be convex; and an image-side surface of the fourth lens may be convex.

Other features and aspects will be apparent from the following detailed description, the drawings, and the claims.

BRIEF DESCRIPTION OF DRAWINGS

FIG. 4 is a table listing characteristics of the lenses of the lens module illustrated in FIG. 1.
FIG. 5 is a table listing conic constants and aspheric coefficients of the lenses of the lens module illustrated in FIG. 1.

FIG. 9 is a table listing characteristics of the lenses of the lens module illustrated in FIG. 6.

FIG. 10 is a table listing conic constants and aspheric coefficients of the lenses of the lens module illustrated in FIG. 6.

FIG. 14 is a table listing characteristics of the lenses of the lens module illustrated in FIG. 11.

FIG. 15 is a table listing conic constants and aspheric coefficients of the lenses of the lens module illustrated in FIG. 11.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
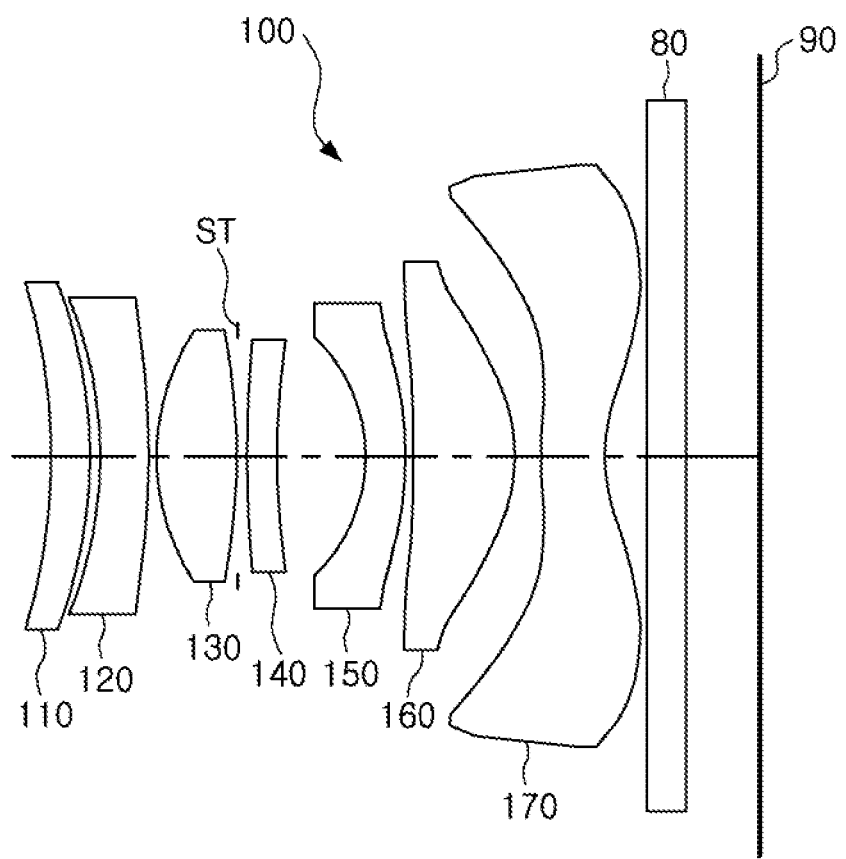
FIG. 1 is a view of a first example of a lens module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In this application, a first lens refers to a lens closest to an object (or a subject), while a seventh lens refers to a lens closest to an image plane (or an image sensor). Further, a first surface of each lens refers to a surface thereof closest to an object (or a subject), and a second surface of each lens refers to a surface thereof closest to an image plane (or an image sensor). Further, all of radii of curvature, thicknesses, OALs (optical axis distances from a first surface of the first lens to the image plane), SLs (distances from a stop to an image plane), IMGHs (image heights), and BFLs (back focus lengths) of the lenses, an overall focal length of an optical system, and a focal length of each lens are expressed in millimeters (mm). Additionally, thicknesses of lenses, gaps between the lenses, OALs, and SLs are distances measured based on an optical axis of the lenses. Further, in a description for shapes of the lenses, a statement that one surface of a lens is convex means that an optical axis portion of a corresponding surface is convex, and a statement that one surface of a lens is concave means that an optical axis portion of a corresponding surface is concave. Therefore, although it may be stated that one surface of a lens is convex, an edge portion of the lens may be concave. Likewise, although it is may be stated that one surface of a lens is concave, an edge portion of the lens may be convex.

A lens module includes an optical system including a plurality of lenses. For example, the optical system of the lens module may include seven lenses having refractive power. However, the lens module is not limited to only including the seven lenses. For example, the lens module may include other components that do not have refractive power. As an example, the lens module may include a stop controlling an amount of light. As another example, the lens module may further include an infrared cut-off filter filtering infrared light. As another example, the lens module may further include an image sensor (that is, an imaging device) converting an image of a subject incident thereon through the optical system into electrical signals. As another example, the lens module may further include a gap maintaining member adjusting a gap between lenses.

First to seventh lenses may be formed of materials having a refractive index different from that of air. For example, the first to seventh lenses may be formed of plastic or glass. At least one of the first to seventh lenses may have an aspheric shape. As an example, only the seventh lens of the first to seventh lenses may have an aspheric shape. As another example, at least one surface of all of the first to seventh lenses may be aspherical. Here, the aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad (1)$$

Here, c is an inverse of a radius of curvature of a corresponding lens, k is a conic constant, and r is a distance from a certain point on an aspherical surface to an optical axis in a direction perpendicular to the optical axis. In addition, constants A to J are respectively 4th order to 20th order aspheric coefficients. In addition, Z is a distance between the certain point on the aspherical surface at the distance r and a tangential plane meeting the apex of the aspherical surface of the lens.

The optical system of the lens module may have a wide field of view (FOV) of 80° or more. Therefore, the lens module may easily image a wide background or object.

The lens module includes the first to seventh lenses. In addition, the lens module includes include a filter and an image sensor. Next, the above-mentioned components will be described.

The first lens may have refractive power. For example, the first lens may have positive refractive power.

The first lens may have a meniscus shape. As an example, the first lens may have a meniscus shape of which a first surface (object-side surface) is convex and a second surface (image-side surface) is concave.

The first lens may have an aspherical surface. For example, both surfaces of the first lens may be aspherical. The first lens may be formed of a material having high light transmissivity and excellent workability. For example, the first lens may be formed of plastic. However, a material of the first lens is not limited to plastic. For example, the first lens may be formed of glass.

The first lens may be formed of a material having a high refractive index. For example, the first lens may be formed of a material having a refractive index of 1.70 or more. The first lens formed of this material may easily refract light even while having a small curvature. Therefore, the first lens formed of this material may be easily manufactured and be advantageous in lowering a defect rate depending on a manufacturing tolerance. In addition, the first lens formed of this material may decrease a distance between lenses, and thus it may be advantageous in miniaturizing the lens module.

The second lens may have refractive power. For example, the second lens may have negative refractive power.

The second lens may have a meniscus shape. For example, the second lens may have a meniscus shape of which a first surface is concave and a second surface is convex.

The second lens may have an aspherical surface. For example, an image-side surface of the second lens may be aspherical. The second lens may be formed of a material having high light transmissivity and excellent workability. For example, the second lens may be formed of plastic. However, a material of the second lens is not limited to plastic. For example, the second lens may be formed of glass.

The second lens may be formed of a material having a high refractive index. For example, the second lens may be formed of a material having a refractive index of 1.60 or more (in this case, the second lens may have an Abbe number of 30 or less). The second lens formed of this material may easily refract light even while having a small curvature. Therefore, the second lens formed of this material may be easily manufactured and be advantageous in lowering a defect rate depending on a manufacturing tolerance. In addition, the second lens formed of this material may decrease a distance between lenses, and thus it may be advantageous in miniaturizing the lens module.

The third lens may have refractive power. For example, the third lens may have positive refractive power.

One surface of the third lens may be convex. As an example, a first surface of the third lens may be convex. As another example, a second surface of the third lens may be convex. As another example, both surfaces of the third lens may be convex.

The third lens may have an aspherical surface. For example, both surfaces of the third lens may be aspherical. The third lens may be formed of a material having high light transmissivity and excellent workability. For example, the third lens may be formed of plastic. However, a material of the third lens is not limited to plastic. For example, the third lens may be formed of glass.

The fourth lens may have refractive power. For example, the fourth lens may have negative refractive power.

The fourth lens may have a meniscus shape. For example, the fourth lens may have a meniscus shape of which a first surface is convex and a second surface is concave.

The fourth lens may have an aspherical surface. For example, both surfaces of the fourth lens may be aspherical. The fourth lens may be formed of a material having high light transmissivity and excellent workability. For example, the fourth lens may be formed of plastic. However, a material of the fourth lens is not limited to plastic. For example, the fourth lens may be formed of glass.

The fourth lens may be formed of a material having a high refractive index. For example, the fourth lens may be formed of a material having a refractive index of 1.60 or more (in this case, the fourth lens may have an Abbe number of 30 or less). The fourth lens formed of this material may easily refract light even while having a small curvature. Therefore, the fourth lens formed of this material may be easily manufactured and be advantageous in lowering a defective rate depending on a manufacturing tolerance. In addition, the fourth lens formed of this material may decrease a distance between lenses, and thus it may be advantageous in miniaturizing the lens module.

The fifth lens may have refractive power. For example, the fifth lens may have negative refractive power.

The fifth lens may have a meniscus shape. For example, the fifth lens may have a meniscus shape of which a first surface is concave and a second surface is convex.

The fifth lens may have an aspherical surface. For example, both surfaces of the fifth lens may be aspherical. The fifth lens may be formed of a material having high light transmissivity and excellent workability. For example, the fifth lens may be formed of plastic. However, a material of the fifth lens is not limited to plastic. For example, the fifth lens may be formed of glass.

The fifth lens may be formed of a material having a high refractive index. For example, the fifth lens may be formed of a material having a refractive index of 1.60 or more (in this case, the fifth lens may have an Abbe number of 30 or less). The fifth lens formed of this material may easily refract light even while having a small curvature. Therefore, the fifth lens formed of this material may be easily manufactured and be advantageous in lowering a defective rate depending on a manufacturing tolerance. In addition, the fifth lens formed of this material may decrease a distance between lenses, and thus it may be advantageous in miniaturizing the lens module.

The sixth lens may have refractive power. For example, the sixth lens may have positive refractive power.

The sixth lens may have a meniscus shape. For example, the sixth lens may have a meniscus shape of which a first surface is concave and a second surface is convex.

The sixth lens may have an aspherical surface. For example, both surfaces of the sixth lens may be aspherical. The sixth lens may be formed of a material having high light transmissivity and high workability. For example, the sixth lens may be formed of plastic. However, a material of the sixth lens is not limited to plastic. For example, the sixth lens may be formed of glass.

The seventh lens may have refractive power. For example, the seventh lens may have negative refractive power.

One or more inflection points may be formed on at least one of an object-side surface and an image-side surface of the seventh lens. As an example, a first surface of the seventh lens may be convex at the center of an optical axis, but may be concave in the vicinity of the optical axis. As another example, a second surface of the seventh lens may be concave at the center of the optical axis, but may be convex in the vicinity of the optical axis.

The seventh lens may have an aspherical surface. For example, both surfaces of the seventh lens may be aspherical. The seventh lens may be formed of a material having high light transmissivity and excellent workability. For example, the seventh lens may be formed of plastic. However, a material of the seventh lens is not limited to plastic. For example, the seventh lens may be formed of glass.

The filter may filter a partial wavelength from incident light incident through the first to seventh lenses. For example, the filter may be an infrared cut-off filter filtering an infrared wavelength of the incident light. The filter may be formed of plastic or glass and have an Abbe number of 60 or more.

The image sensor may have a high resolution of 1300 megapixels. For example, a unit size of the pixels of the image sensor may be 1.12 μm or less.

The lens module configured as described above may have a wide field of view. For example, the lens module may have a field of view of 80° or more. In addition, the lens module may have a relatively short length. For example, an overall length TTL (a distance from the object-side surface of the first lens to the image plane) of the optical system of the lens module may be 5.80 mm or less. Therefore, the lens module may be advantageously miniaturized.

The lens module may satisfy the following Conditional Expression:

$$80°<FOV$$

Here, FOV is a field of view of the optical system including the first to seventh lenses.

The lens module may satisfy at least one of the following Conditional Expressions:

$$d2<0.5 \text{ mm}$$

$$d2/d3<0.2$$

Here, d2 is a distance from an image-side surface of the first lens to an object-side surface of the second lens, and d3 is a thickness of the second lens.

The lens module may satisfy at least one of the following Conditional Expressions:

$$V4<30$$

$$V5<30$$

$$(V4+V5)/30<1.8$$

Here, V4 is an Abbe number of the fourth lens, and V5 is an Abbe number of the fifth lens.

The above Conditional Expressions are conditions for selecting materials of the fourth and fifth lenses. For example, in a case in which the above Conditional Expressions are satisfied, the fourth and fifth lenses are advantageous in improving chromatic aberration.

The lens module may satisfy at least one of the following Conditional Expressions:

$$d7<0.26 \text{ mm}$$

$$d7/d8<0.5$$

Here, d7 is a thickness of the fourth lens, and d8 is a distance from an image-side surface of the fourth lens to an object-side surface of the fifth lens.

FIG. 1 is a view of a first example of a lens module.

A lens module 100 includes an optical system including a first lens 110, a second lens 120, a third lens 130, a fourth lens 140, a fifth lens 150, a sixth lens 160, and a seventh lens 170. In addition, the lens module 100 further includes an infrared cut-off filter 80 and an image sensor 90. Further, the lens module 100 includes a stop (ST). In this example, the stop is disposed between the third lens 130 and the fourth lens 140.

In this example, the first lens 110 has positive refractive power, and an object-side surface thereof is concave and an image-side surface thereof is convex. The second lens 120 has negative refractive power, and an object-side surface thereof is concave and an image-side surface thereof is convex. The third lens 130 has positive refractive power, and an object-side surface thereof is convex and an image-side surface thereof is convex. The fourth lens 140 has negative refractive power, and an object-side surface thereof is convex and an image-side surface thereof is concave. The fifth lens 150 has negative refractive power, and an object-side surface thereof is concave and an image-side surface thereof is convex. The sixth lens 160 has positive refractive power, and an object-side surface thereof is concave and an image-side surface thereof is convex. The seventh lens 170 has negative refractive power, and an object-side surface thereof is convex and an image-side surface thereof is concave. In addition, the seventh lens 170 has an aspheric shape in which inflection points are formed on an object-side surface and an image-side surface thereof, respectively.

In this example, all of the first lens 110, the third lens 130, and the sixth lens 160 have positive refractive power. Among these lenses, the third lens 130 has the strongest refractive power, and the first lens 110 has the weakest refractive power.

In this example, all of the second lens 120, the fourth lens 140, the fifth lens 150, and the seventh lens 170 have negative refractive power. Among these lenses, the fourth lens 140 has the strongest refractive power, and the seventh lens 170 has the weakest refractive power.

Figure 2:
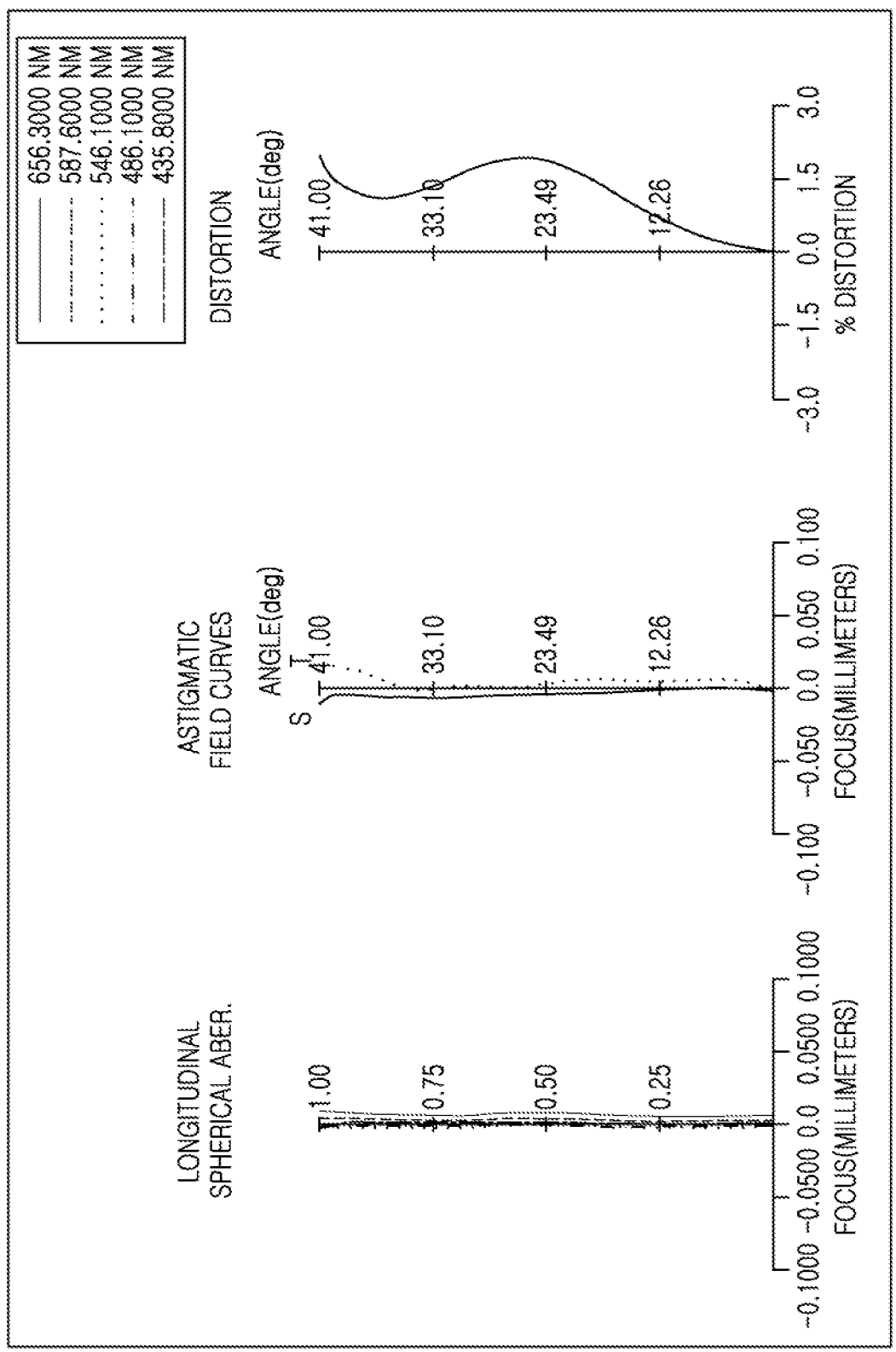
FIG. 2 illustrates graphs including curves representing aberration characteristics of the lens module illustrated in FIG. 1.

FIG. 2 illustrates graphs including curves representing aberration characteristics of the lens module illustrated in FIG. 1.

Figure 3:
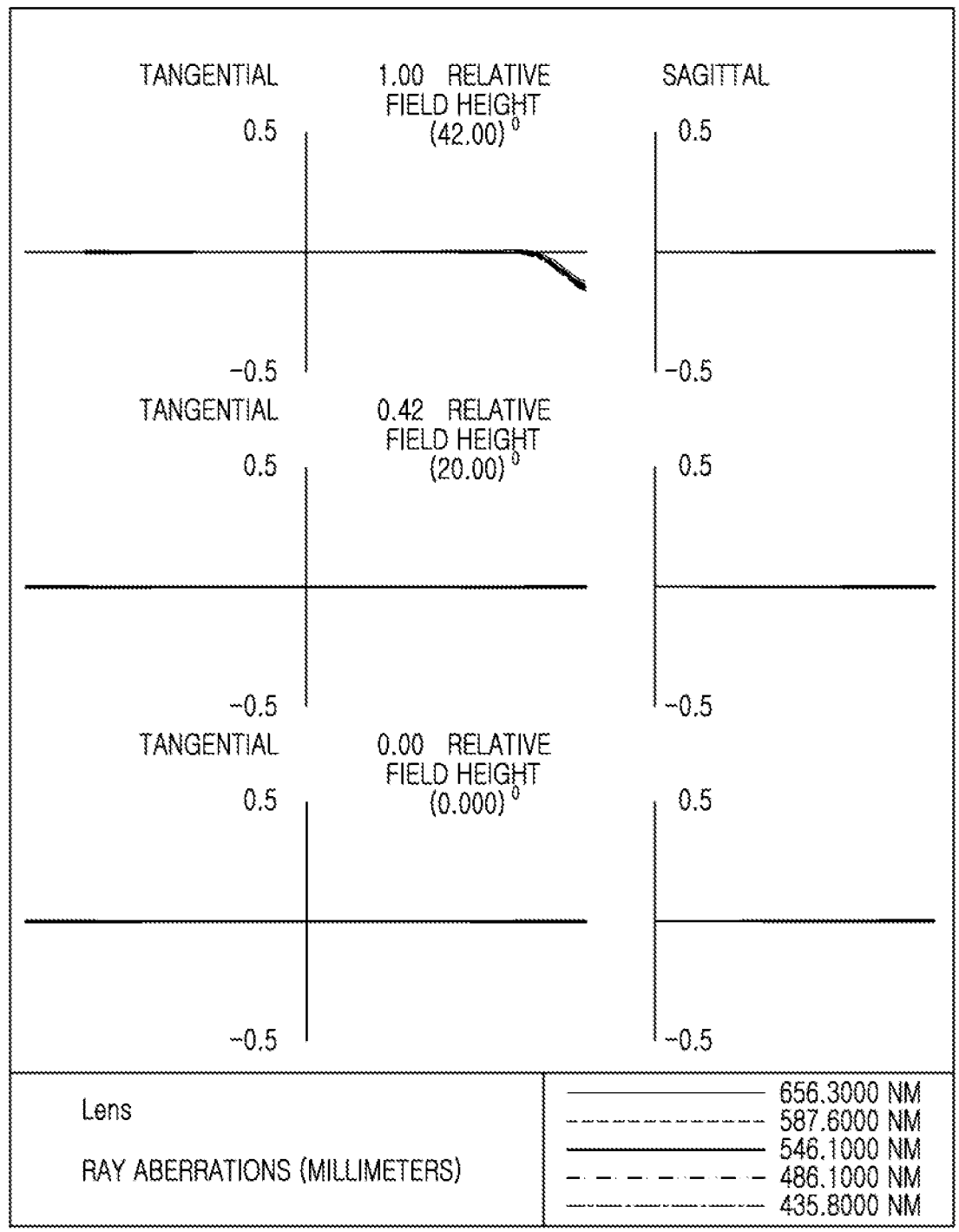
FIG. 3 illustrates graphs including curves representing modulation transfer function (MTF) characteristics of the lens module illustrated in FIG. 1.

FIG. 3 illustrates graphs including curves representing modulation transfer function (MTF) characteristics of the lens module illustrated in FIG. 1.

FIG. 4 is a table listing characteristics of the lenses of the lens module illustrated in FIG. 1. In FIG. 4, Surface Nos. S1 and S2 indicate the first surface (object-side surface) and the second surface (image-side surface) of the first lens, and Surface Nos. S3 and S4 indicate the first and second surfaces of the second lens. Similarly, Surface Nos. S5 to S14 indicate the first and second surfaces of the third to seventh lenses, respectively. In addition, Surface Nos. S15 and S16 indicate first and second surfaces of the infrared cut-off filter.

In this example, effective radii of the lenses gradually decrease from the object-side surface of the first lens to the image-side surface of the third lens, and gradually increase from the object-side surface of the fourth lens to the image-side surface of the seventh lens, as illustrated in FIG. 4. That is, as can be seen from FIG. 4, the effective radii of the surfaces of the first lens to the third lens strictly decrease from the object-side surface of the first lens to the image-side surface of the third lens, and the effective radii of the surfaces of the fourth lens to the seventh lens strictly increase from the object-side surface of the fourth lens to the image-side surface of the seventh lens. In this example, the effective radius of the object-side surface of the fourth lens is greater than the effective radius of the image-side surface of the third lens. In a strictly decreasing sequence of values, each value is less than the preceding value in the sequence. In a strictly increasing sequence of values, each value is greater than the preceding value in the sequence.

FIG. 5 is a table listing conic constants and aspheric coefficients of the lenses of the lens module illustrated in FIG. 1. In FIGS. 5, S1 to S14 indicate Surface Nos. of respective surfaces of the first to seventh lenses, and k and A to J indicate conic constants (k) and aspheric coefficients (A to J) of respective surfaces of the first to seventh lenses.

Figure 6:
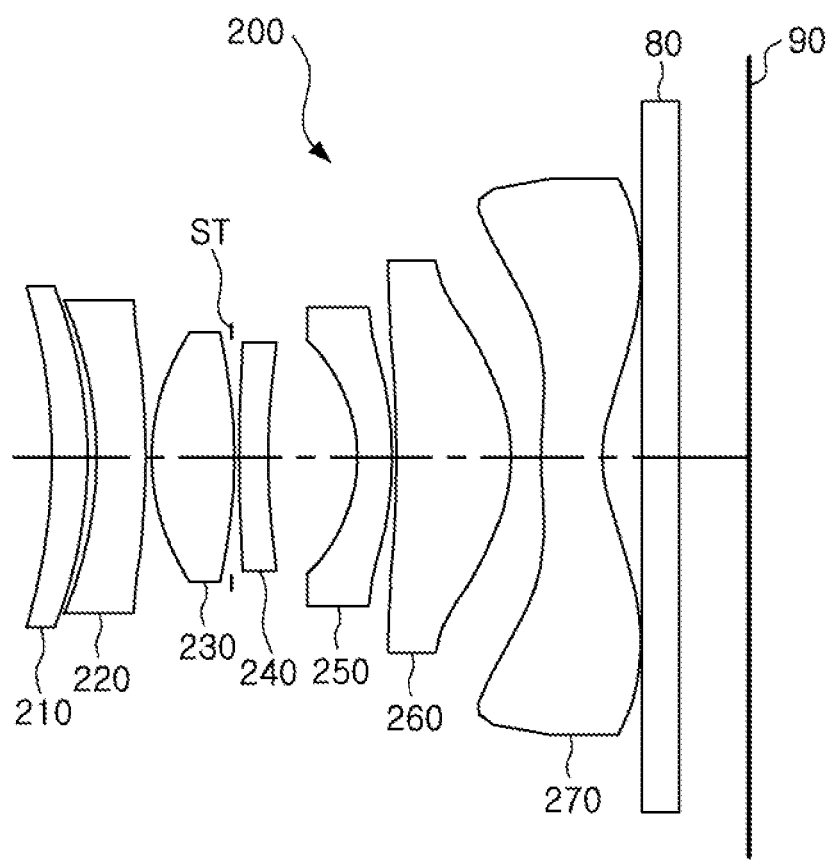
FIG. 6 is a view of a second example of a lens module.

FIG. 6 is a view of a second example of a lens module.

A lens module 200 includes an optical system including a first lens 210, a second lens 220, a third lens 230, a fourth lens 240, a fifth lens 250, a sixth lens 260, and a seventh lens 270. In addition, the lens module 200 further includes an infrared cut-off filter 80 and an image sensor 90. Further, the lens module 200 may include a stop (ST). In this example, the stop is disposed between the third lens 230 and the fourth lens 240.

In this example, the first lens 210 has positive refractive power, and an object-side surface thereof is concave and an image-side surface thereof is convex. The second lens 220 has negative refractive power, and an object-side surface thereof is concave and an image-side surface thereof is convex. The third lens 230 has positive refractive power, and an object-side surface thereof is convex and an image-side surface thereof is convex. The fourth lens 240 has negative refractive power, and an object-side surface thereof is convex and an image-side surface thereof is concave. The fifth lens 250 has negative refractive power, and an object-side surface thereof is concave and an image-side surface thereof is convex. The sixth lens 260 has positive refractive power, and an object-side surface thereof is concave and an image-side surface thereof is convex. The seventh lens 270 has negative refractive power, and an object-side surface thereof is convex and an image-side surface thereof is concave. In addition, the seventh lens 270 has an aspheric shape in which inflection points are formed on an object-side surface and an image-side surface thereof, respectively.

In this example, all of the first lens 210, the third lens 230, and the sixth lens 260 have positive refractive power. Among these lenses, the third lens 230 has the strongest refractive power, and the first lens 210 has the weakest refractive power.

In this example, all of the second lens 220, the fourth lens 240, the fifth lens 250, and the seventh lens 270 have negative refractive power. Among these lenses, the fourth lens 240 has the strongest refractive power, and the seventh lens 270 has the weakest refractive power.

Figure 7:
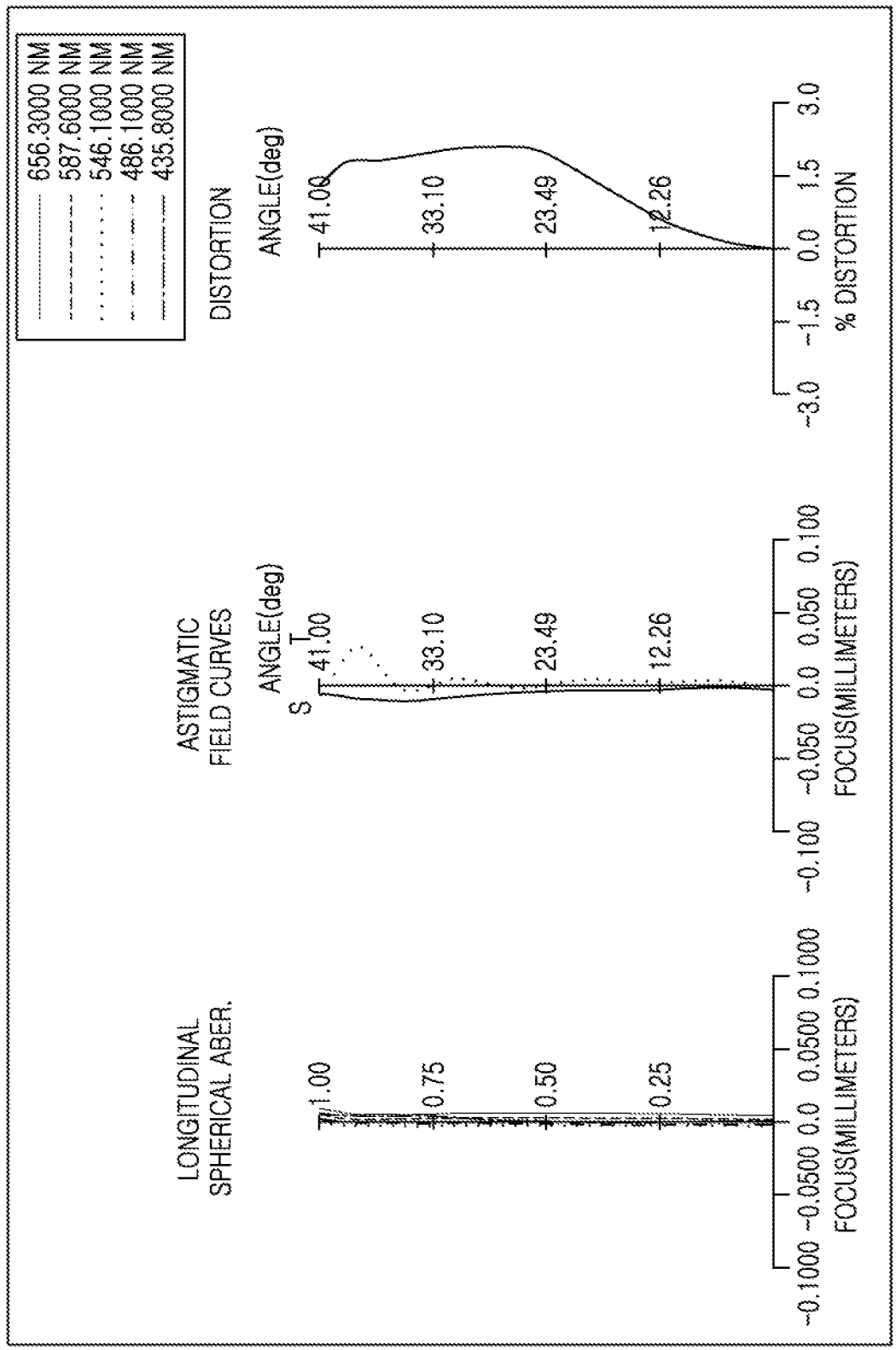
FIG. 7 illustrates graphs including curves representing aberration characteristics of the lens module illustrated in FIG. 6.

FIG. 7 illustrates graphs including curves representing aberration characteristics of the lens module illustrated in FIG. 6.

Figure 8:
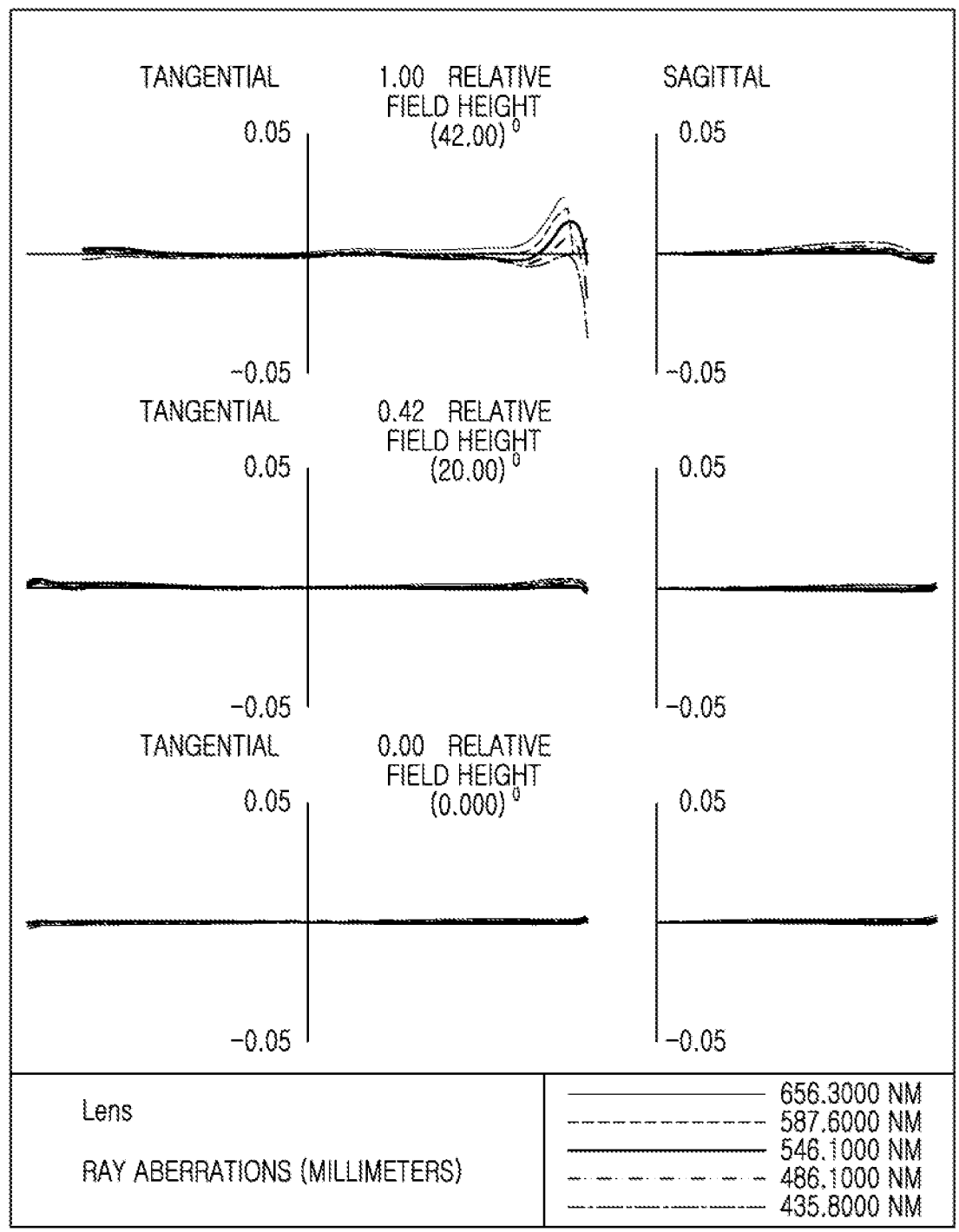
FIG. 8 illustrates graphs including curves representing MTF characteristics of the lens module illustrated in FIG. 6.

FIG. 8 illustrates graphs including curves representing MTF characteristics of the lens module illustrated in FIG. 6.

FIG. 9 is a table listing characteristics of the lenses of the lens module illustrated in FIG. 6. In FIG. 9, Surface Nos. S1 and S2 indicate the first surface (object-side surface) and the second surface (image-side surface) of the first lens, and Surface Nos. S3 and S4 indicate the first and second surfaces of the second lens. Similarly, Surface Nos. S5 to S14 indicate the first and second surfaces of the third to seventh lenses, respectively. In addition, Surface Nos. S15 and S16 indicate first and second surfaces of the infrared cut-off filter.

In this example, effective radii of the lenses gradually decrease from the object-side surface of the first lens to the image-side surface of the third lens, and gradually increase from the object-side surface of the fourth lens to the image-side surface of the seventh lens, as illustrated in FIG. 9. That is, as can be seen from FIG. 9, the effective radii of the surfaces of the first lens to the third lens strictly decrease from the object-side surface of the first lens to the image-side surface of the third lens, and the effective radii of the surfaces of the fourth lens to the seventh lens strictly increase from the object-side surface of the fourth lens to the image-side surface of the seventh lens. In this example, the effective radius of the object-side surface of the fourth lens is greater than the effective radius of the image-side surface of the third lens.

FIG. 10 is a table listing conic constants and aspheric coefficients of the lenses of the lens module illustrated in FIG. 6. In FIGS. 10, S1 to S14 indicate Surface Nos. of respective surfaces of the first to seventh lenses, and k and A to J indicate conic constants (k) and aspheric coefficients (A to J) of respective surfaces of the first to seventh lenses.

Figure 11:
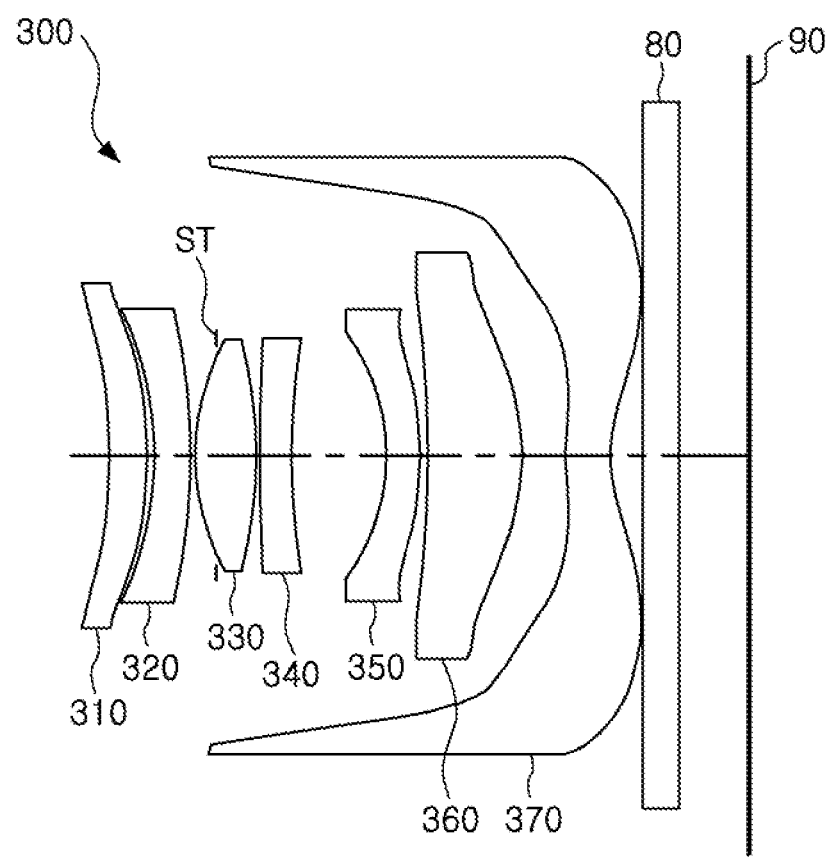
FIG. 11 is a view of a third example of a lens module.

FIG. 11 is a view of a third example of a lens module.

A lens module 300 includes an optical system including a first lens 310, a second lens 320, a third lens 330, a fourth lens 340, a fifth lens 350, a sixth lens 360, and a seventh lens 370. In addition, the lens module 300 further includes an infrared cut-off filter 80 and an image sensor 90. Further, the lens module 300 includes a stop (ST). In this example, the stop is disposed in front of the third lens 330.

In this example, the first lens 310 has positive refractive power, and an object-side surface thereof is concave and an image-side surface thereof is convex. The second lens 320 has negative refractive power, and an object-side surface thereof is concave and an image-side surface thereof is convex. The third lens 330 has positive refractive power, and an object-side surface thereof is convex and an image-side surface thereof is convex. The fourth lens 340 has negative refractive power, and an object-side surface thereof is convex and an image-side surface thereof is concave. The fifth lens 350 has negative refractive power, and an object-side surface thereof is concave and an image-side surface thereof is convex. The sixth lens 360 has positive refractive power, and an object-side surface thereof is concave and an image-side surface thereof is convex. The seventh lens 370 has negative refractive power, and an object-side surface thereof is convex and an image-side surface thereof is concave. In addition, the seventh lens 370 has an aspheric shape in which inflection points are formed on an object-side surface and an image-side surface thereof, respectively.

In this example, all of the first lens 310, the third lens 330, and the sixth lens 360 have positive refractive power. Among these lenses, the third lens 330 has the strongest refractive power, and the first lens 310 has the weakest refractive power.

In this example, all of the second lens 320, the fourth lens 340, the fifth lens 350, and the seventh lens 370 have negative refractive power. Among these lenses, the fourth lens 340 has the strongest refractive power, and the seventh lens 370 has the weakest refractive power.

Figure 12:
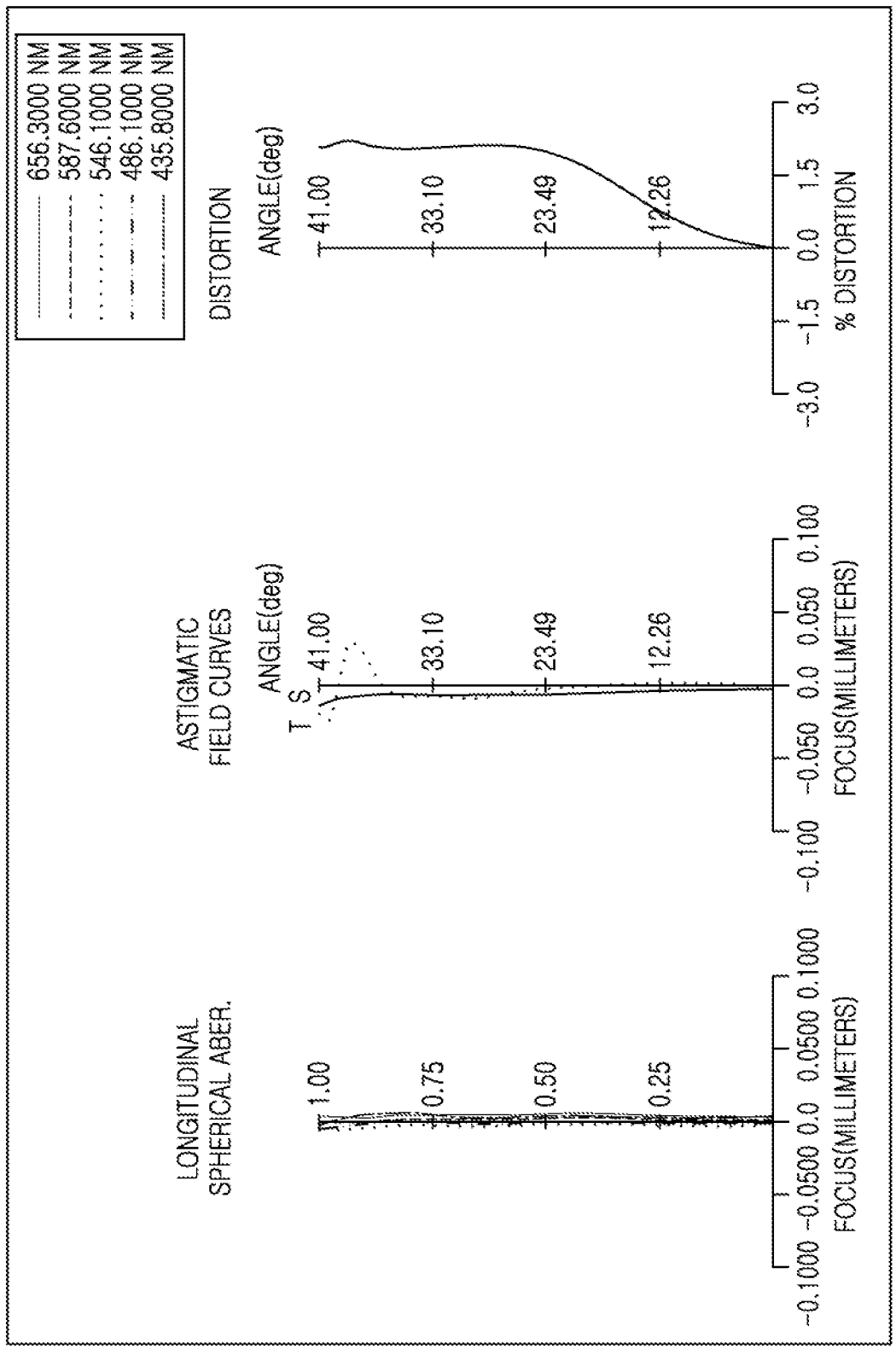
FIG. 12 illustrates graphs including curves representing aberration characteristics of the lens module illustrated in FIG. 11.

FIG. 12 illustrates graphs including curves representing aberration characteristics of the lens module illustrated in FIG. 11.

Figure 13:
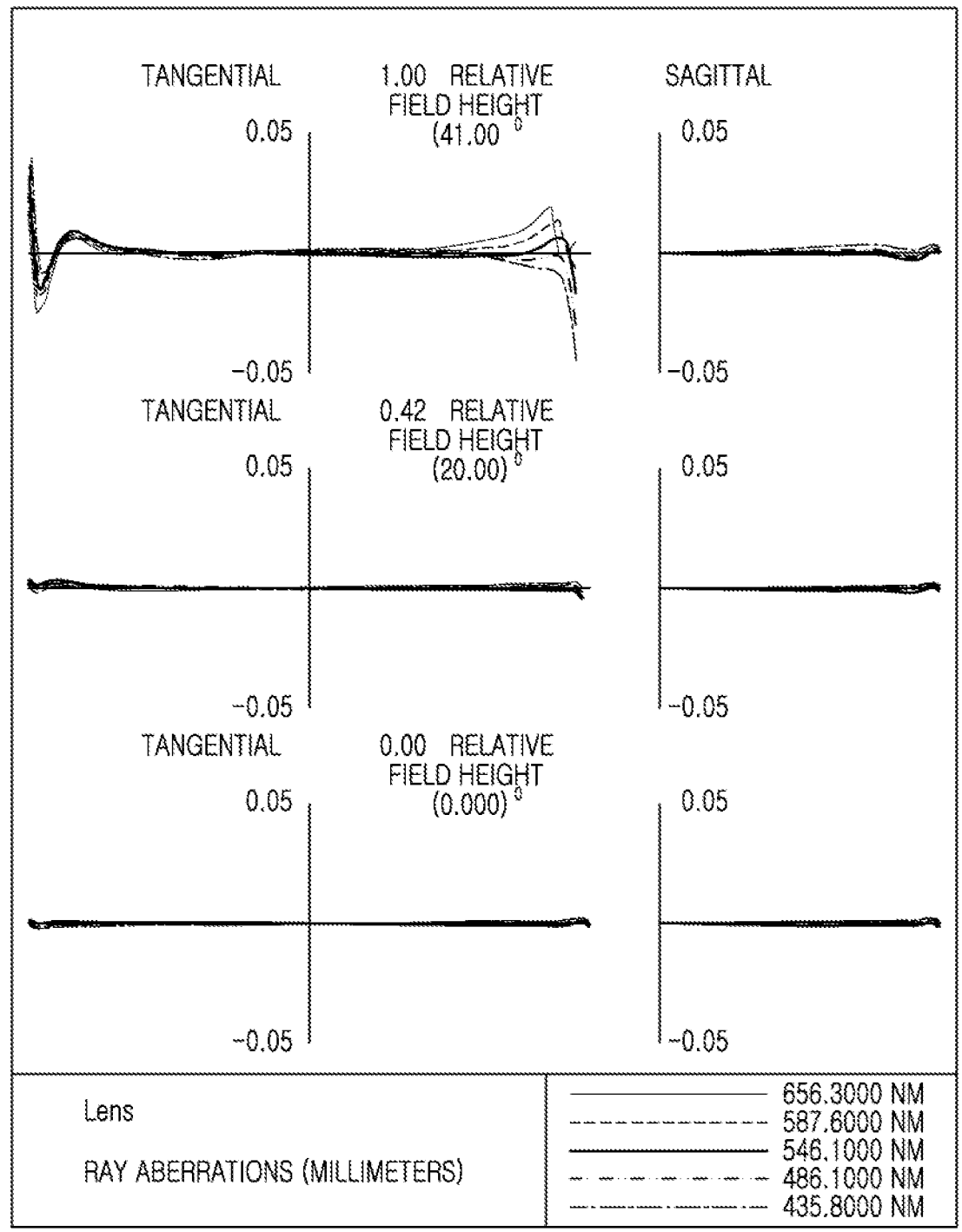
FIG. 13 illustrates graphs including curves representing MTF characteristics of the lens module illustrated in FIG. 11.

FIG. 13 illustrates graphs including curves representing MTF characteristics of the lens module illustrated in FIG. 11.

FIG. 14 is a table listing characteristics of the lenses of the lens module illustrated in FIG. 11. In FIG. 14, Surface Nos. S1 and S2 indicate the first surface (object-side surface) and the second surface (image-side surface) of the first lens, and Surface Nos. S3 and S4 indicate the first and second surfaces of the second lens. Similarly, Surface Nos. S5 to S14 indicate the first and second surfaces of the third to seventh lenses, respectively. In addition, Surface Nos. S15 and S16 indicate first and second surfaces of the infrared cut-off filter.

In this example, effective radii of the lenses gradually decrease from the object-side surface of the first lens to the image-side surface of the third lens, and gradually increase from the object-side surface of the fourth lens to the image-side surface of the seventh lens, as illustrated in FIG. 14. That is, as can be seen from FIG. 14, the effective radii of the surfaces of the first lens to the third lens strictly decrease from the object-side surface of the first lens to the image-side surface of the third lens, and the effective radii of the surfaces of the fourth lens to the seventh lens strictly increase from the object-side surface of the fourth lens to the image-side surface of the seventh lens. In this example, the effective radius of the object-side surface of the fourth lens is greater than the effective radius of the image-side surface of the third lens.

FIG. 15 is a table listing conic constants and aspheric coefficients of the lenses of the lens module illustrated in FIG. 11. In FIGS. 15, S1 to S14 indicate Surface Nos. of respective surfaces of the first to seventh lenses, and k and A to J indicate conic constants (k) and aspheric coefficients (A to J) of respective surfaces of the first to seventh lenses.

The following Table 1 lists optical characteristics of the lens modules of the first to third examples. The lens module has an overall focal length (f) of 3.5 to 3.7. A focal length (f1) of the first lens is determined to be in a range of 14.0 to 29.0. A focal length (f2) of the second lens is determined to be in a range of −14.0 to −11.0. A focal length (f3) of the third lens is determined to be in a range of 2.4 to 2.7. A focal length (f4) of the fourth lens is determined to be in a range of −21.0 to −10.0. A focal length (f5) of the fifth lens is determined to be in a range of −8.0 to −4.0. A focal length (f6) of the sixth lens is determined to be in a range of 2.5 to 3.3. A focal length (f7) of the seventh lens is determined to be in a range of −3.0 to −2.6.

In the lens module, an overall length (TTL) of the optical system is determined to be in a range of 5.1 to 5.8. An overall length (SL) of the stop to the image plane is determined to be in a range of 4.1 to 4.6. A field of view (FOV) of the lens module is 80° or more. A f-number of the lens module is 2.2 or less.

TABLE 1

| Remarks | First Example | Second Example | Third Example |
|---|---|---|---|
| f | 3.639 | 3.633 | 3.610 |
| f1 | 26.145 | 27.808 | 14.779 |
| f2 | −12.230 | −12.978 | −12.308 |
| f3 | 2.597 | 2.585 | 2.534 |
| f4 | −19.490 | −18.629 | −11.205 |
| f5 | −5.008 | −4.976 | −6.701 |
| f6 | 2.648 | 2.673 | 3.173 |
| f7 | −2.838 | −2.798 | −2.718 |
| TTL | 5.700 | 5.700 | 5.200 |
| SL | 4.180 | 4.200 | 4.500 |
| FOV | 82.0 | 82.0 | 82.0 |
| f-number | 2.11 | 2.11 | 2.10 |

The following Table 2 lists values of Conditional Expressions of the lens modules of the first to third examples.

TABLE 2

| Conditional Expressions | First Example | Second Example | Third Example |
|---|---|---|---|
| d2/d3 | 0.1794 | 0.1678 | 0.1915 |
| (V4 + V5)/30 | 1.5580 | 1.5580 | 1.5580 |
| d7/d8 | 0.3530 | 0.3453 | 0.3194 |

As seen in Table 2, the lens modules of the first to third examples satisfy all of the Conditional Expressions.

The examples described above enable the optical system to have a high resolution.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
   a first lens having positive refractive power;
   a second lens having a refractive power;
   a third lens having positive refractive power;
   a fourth lens having negative refractive power and a concave image-side surface;
   a fifth lens having a concave object-side surface;
   a sixth lens having a refractive power; and
   a seventh lens having a convex object-side surface,
   wherein the first to seventh lenses are sequentially disposed in numerical order from an object side of the lens module,
   wherein a radius of curvature of an object-side surface of the fourth lens is greater than a radius of curvature of an object-side surface of the second lens.

2. The lens module of claim 1, wherein the second lens has negative refractive power.

3. The lens module of claim 1, wherein the sixth lens has positive refractive power.

4. The lens module of claim 1, wherein the seventh lens has negative refractive power.

5. The lens module of claim 1, wherein the third lens has a convex image-side surface.

6. The lens module of claim 1, wherein the fourth lens has a convex object-side surface.

7. The lens module of claim 1, wherein the fifth lens has a convex image-side surface.

8. The lens module of claim 1, wherein the seventh lens has a concave image-side surface.

9. A lens module comprising:
   a first lens having positive refractive power;
   a second lens having a refractive power;
   a third lens having positive refractive power;
   a fourth lens having negative refractive power and a concave image-side surface;
   a fifth lens having a concave object-side surface;
   a sixth lens having a refractive power; and
   a seventh lens having a convex object-side surface,
   wherein the first to seventh lenses are sequentially disposed in numerical order from an object side of the lens module,
   wherein a radius of curvature of an image-side surface of the sixth lens is greater than a radius of curvature of an object-side surface of the sixth lens.

10. The lens module of claim 9, wherein an F number of the lens module is 2.2 or less.

11. The lens module of claim 9, wherein d2/d3<0.2, where d2 is a distance from an image-side surface of the first lens to an object-side surface of the second lens and d3 is a thickness along an optical axis of the second lens.

12. The lens module of claim 9, wherein V4<30, where V4 is an Abbe number of the fourth lens.

13. The lens module of claim 9, wherein a radius of curvature of an object-side surface of the fourth lens is greater than a radius of curvature of an object-side surface of the second lens.

14. The lens module of claim 9, wherein a thickness along an optical axis of the fifth lens is greater than a thickness along an optical axis of the fourth lens.

15. A lens module comprising:
 a first lens having positive refractive power;
 a second lens having a refractive power;
 a third lens having positive refractive power;
 a fourth lens having negative refractive power;
 a fifth lens having a concave object-side surface and a convex image-side surface;
 a sixth lens having a refractive power; and
 a seventh lens having a convex object-side surface,
 wherein the first to seventh lenses are sequentially disposed in numerical order from an object side of the lens module,
 wherein a radius of curvature of an object-side surface of the fourth lens is greater than a radius of curvature of an object-side surface of the second lens.

\* \* \* \* \*